(12) United States Patent
Ota et al.

(10) Patent No.: US 8,818,174 B2
(45) Date of Patent: Aug. 26, 2014

(54) REPRODUCTION APPARATUS AND CONTROL METHOD THEREFOR

(75) Inventors: Tomohiro Ota, Kawasaki (JP); Toshimichi Ise, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/552,179

(22) Filed: Jul. 18, 2012

(65) Prior Publication Data

US 2013/0034340 A1 Feb. 7, 2013

(30) Foreign Application Priority Data

Aug. 3, 2011 (JP) ................. 2011-170446

(51) Int. Cl.
*H04N 5/93* (2006.01)
*H04N 5/77* (2006.01)
*H04N 5/765* (2006.01)
*H04N 9/82* (2006.01)
*H04N 9/804* (2006.01)

(52) U.S. Cl.
CPC ............... *H04N 5/77* (2013.01); *H04N 9/8211* (2013.01); *H04N 9/8042* (2013.01); *H04N 5/765* (2013.01)
USPC ....................................... 386/280

(58) Field of Classification Search
CPC .... G11B 7/007; G11B 20/10; G11B 20/1217; G11B 20/0084; H04N 5/76; H04N 7/17318; H04N 7/0887; H04N 7/165; H04N 7/167; H04N 7/173; H04N 7/18; G08B 13/19608; G08B 13/19671; G08B 13/19682
USPC .......... 386/239, 240, 241, 248, 278, 280, 282
See application file for complete search history.

(56) References Cited

U.S. PATENT DOCUMENTS

| 6,967,666 | B1 * | 11/2005 | Koda | 345/638 |
| 7,075,556 | B1 * | 7/2006 | Meier et al. | 345/629 |
| 2011/0107238 | A1 * | 5/2011 | Liu et al. | 715/756 |

FOREIGN PATENT DOCUMENTS

JP 11-187348 7/1999

* cited by examiner

*Primary Examiner* — Tat Chio
(74) *Attorney, Agent, or Firm* — Cowan, Liebowitz & Latman, P.C.

(57) ABSTRACT

A reproducing unit reproduces/displays moving image data; a drawing unit enables a user to draw a freehand image on a displayed moving image while reproducing the moving image; a recording unit records freehand image data for reconstructing the freehand image drawn by the drawing unit in synchronism with a timing of reproducing the moving image data; an instruction unit causes reproduction of the moving image to start from an arbitrary point in the middle of the moving image; and a control unit reads out the freehand image before the instructed point by the instruction to start reproduction of the moving image from a point in the middle of a drawing operation of the freehand image, and displays the readout freehand image superimposed on a displayed moving image when the reproduction starts.

8 Claims, 11 Drawing Sheets

F I G. 2

|  | t | x | y | attr |
|---|---|---|---|---|
| e0 | 0:00:00:00 | – | – | clear |
| e1 | 0:00:04:12 | 456 | 288 | pen A |
| e2 | 0:00:04:14 | 456 | 289 | pen A |
| e3 | 0:00:04:14 | 457 | 290 | pen A |
| e4 | 0:00:04:15 | 457 | 291 | pen A |
| ... | ... | ... | ... | ... |
| en-1 | 0:02:41:08 | 1356 | 324 | pen B |
| en | 0:02:50:47 | - | - | clear |
| en+1 | 0:03:01:32 | 1596 | 636 | pen B |
| ... | ... | ... | ... | ... |

FIG. 5

|  | t | x | y | attr | bmp |
|---|---|---|---|---|---|
| e0 | 0:00:00:00 | – | – | clear | – |
| e1 | 0:00:04:12 | 456 | 288 | pen A | – |
| e2 | 0:00:04:14 | 456 | 289 | – | – |
| e3 | 0:00:04:14 | 457 | 290 | – | – |
| e4 | 0:00:04:15 | 457 | 291 | – | 0_00_04_15.bmp |
| ... | ... | ... | ... | ... | ... |
| en-1 | 0:02:41:08 | 1356 | 324 | – | 0_02_41_08.bmp |
| en | 0:02:50:47 | – | – | clear | – |
| en+1 | 0:03:01:32 | 1596 | 636 | pen B | – |
| ... | ... | ... | ... | ... | ... |

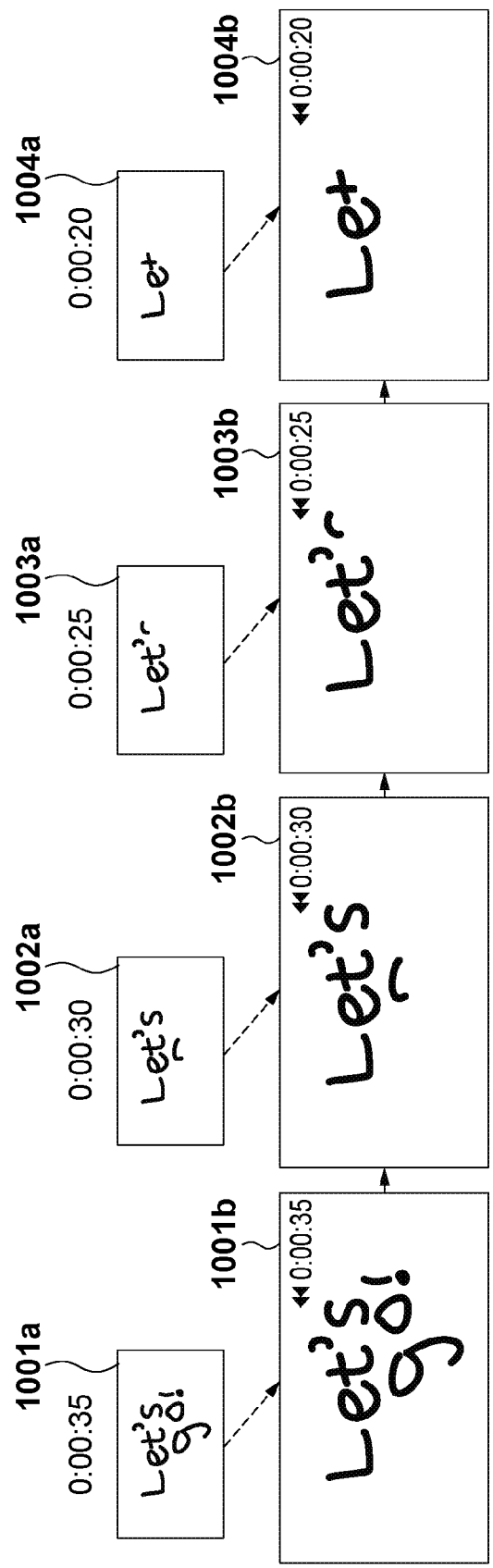

REPRODUCTION APPARATUS AND CONTROL METHOD THEREFOR

BACKGROUND OF THE INVENTION

1. Field of the Invention

The present invention relates to a recording and reproducing technique of recording an image drawn in reproducing a moving image, and reproducing the drawn image together with the moving image.

2. Description of the Related Art

There is provided an apparatus which enables letters, pictures, and the like to be drawn freehand on a display device using a pointing device such as a mouse, touch panel, pen tablet, or trackball. There is also provided an apparatus which can record, in time-series, the coordinate data of freehand drawing input information obtained when drawing letters, pictures, and the like freehand, and reconstruct a drawing process by sequentially reading out the coordinate data in reproducing.

For example, Japanese Patent Laid-Open No. 11-187348 discloses an apparatus which records the coordinate data of freehand drawing input information together with a moving image in a tape recording medium, and then reconstructs a process of drawing the freehand drawing input information by sequentially reading out the coordinate data in reproducing the moving image, thereby displaying the freehand drawing input information superimposed on the moving image data.

In general, if moving image data is recorded by superimposing freehand drawing input information on it, a moving image without the freehand drawing input portion cannot be reproduced. Furthermore, it is necessary to record freehand drawing input information while shooting a moving image. According to Japanese Patent Laid-Open No. 11-187348, however, it is possible to reproduce only the moving image, and to reconstruct a process of drawing the freehand drawing input information while reproducing the moving image.

Japanese Patent Laid-Open No. 11-187348, however, assumes the tape recording medium which cannot be randomly accessed, and therefore, does not consider a case in which the user starts reproduction of the moving image from a midpoint. Thus, if the user wants to start reproduction of the moving image from a midpoint, it is impossible to read out the coordinate data of the freehand drawing input information recorded before the reproduction start position in the tape, thereby disabling to faithfully reconstruct the drawing process.

SUMMARY OF THE INVENTION

The present invention has been made in consideration of the aforementioned problems, and realizes a recording and reproducing technique which can faithfully reconstruct a process of drawing freehand drawing input information even when the user reproduces a moving image from a midpoint.

In order to solve the aforementioned problems, the present invention provides a reproduction apparatus comprising: a reproducing unit configured to reproduce moving image data and display moving image corresponding to the reproduced moving image data on a display unit; a drawing unit configured to enable a user to draw a freehand image on a moving image displayed on the display unit while the moving image is displayed; a recording unit configured to record freehand image data corresponding to the drawn freehand image for reconstructing the freehand image drawn by the drawing unit in synchronism with a timing of reproducing the moving image data; an instruction unit configured to cause reproduction of the moving image data to start from an arbitrary point in the middle of the moving image data; and a control unit configured to control to read out, when the instruction unit instructs to start reproduction of the moving image data from a point in the middle of a drawing operation of the freehand image, the freehand image data before the point instructed by the instruction unit, and to display, on the display unit, the readout freehand image data superimposed on a moving image displayed when the reproduction starts.

In order to solve the aforementioned problems, the present invention provides a control method of a reproduction apparatus having a reproducing unit configured to reproduce moving image data and display moving image corresponding to the reproduced moving data on a display unit, a drawing unit configured to enable a user to draw a freehand image on a moving image displayed on the display unit while the moving image is displayed, and a recording unit configured to record freehand image data corresponding to the drawn freehand image for reconstructing the freehand image drawn by the drawing unit in synchronism with a timing of reproducing the moving image data, the method comprising: an instruction step of causing reproduction of the moving image data to start from an arbitrary point in the middle of the moving image data; and a control step of controlling to read out, when reproduction of the moving image data is instructed to start from a point in the middle of a drawing operation of the freehand image in the instruction step, the freehand image data before the point instructed in the instruction step, and to display, on the display unit, the readout freehand image data superimposed on a moving image displayed when the reproduction starts.

According to the present invention, it is possible to faithfully reconstruct a process of drawing freehand drawing input information even when the user reproduces a moving image from a midpoint.

Further features of the present invention will become apparent from the following description of exemplary embodiments (with reference to the attached drawings).

BRIEF DESCRIPTION OF THE DRAWINGS

FIG. 2 is a table showing an example of a coordinate table according to the first embodiment;

FIG. 5 is a table showing an example of a coordinate table according to the second embodiment;

FIG. 10 is a view showing examples of a reproduction screen in fast-rewind reproduction.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

An embodiment in which an image capturing apparatus of the present invention is applied to a digital video camera (to be simply referred to as a camera hereinafter) will be explained.

<Configuration of Image Capturing Apparatus>

The configuration of a camera 100 of the embodiment will be schematically described with reference to FIG. 1.

Figure 1:
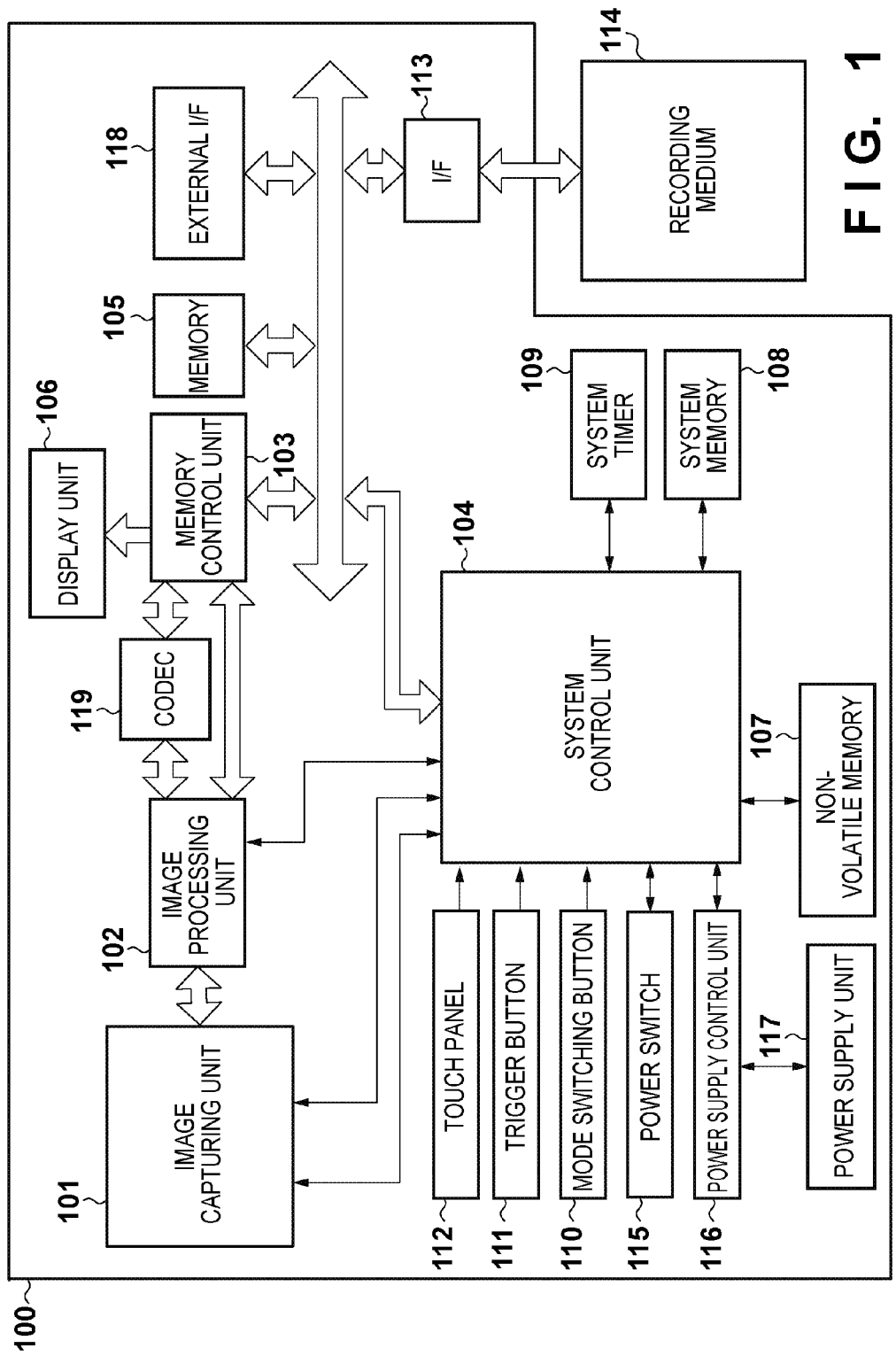
FIG. 1 is a block diagram showing a digital video camera according to an embodiment of the present invention.

Referring to FIG. 1, reference numeral 101 denotes an image capturing unit, which includes an imaging lens having a focusing lens, an aperture stop, a CCD or CMOS element for converting an optical image into an electric signal, and an A/D converter for converting an analog signal into a digital signal.

Reference numeral 102 denotes an image processing unit, which executes predetermined pixel interpolation, resizing processing such as reduction processing, or color conversion processing for moving image data from the image capturing unit 101 or data from a memory control unit 103. Furthermore, the image processing unit 102 executes predetermined computation processing using captured moving image data. Based on the computation result, a system control unit 104 performs an exposure control operation and distance measurement operation. With these operations, AF (Auto Focus) processing and AE (Auto Exposure) processing are executed. The image processing unit 102 also executes predetermined computation processing using the captured moving image data, and then executes AWB (Auto White Balance) processing based on the obtained computation result.

Reference numeral 119 denotes a CODEC, which encodes moving image data from the image processing unit 102 in, for example, a moving image compression scheme such as an MPEG2 or H.264 scheme, and decodes encoded moving image data from the memory control unit 103.

Data output from the image capturing unit 101 is written in a memory 105 via the image processing unit 102, CODEC 119, and memory control unit 103.

The memory 105 stores moving image data which has been generated by the image capturing unit 101 and encoded by the CODEC 119, and moving image data for display on a display unit 106. The memory 105 has a sufficient recording capacity to store a moving image and audio for a predetermined period of time and accompanying freehand drawing input information. The memory 105 also serves as a bitmap memory for OSD display and a video memory for image display.

The display unit 106 includes an LCD panel, and displays a moving image according to the moving image data for display which has been read out from the memory 105. The moving image data which have been accumulated in the memory 105 by the image capturing unit 101 are sequentially transferred to and displayed on the display unit 106, which thus functions as an electronic viewfinder (live-view image display). The display unit 106 also includes a function of superimposing, on a moving image, freehand drawing input information drawn through a touch panel 112 and OSD elements (On Screen Display) such as an icon and time code which have been rasterized in the bitmap memory of the memory 105, and then displaying the moving image.

A non-volatile memory 107 is an electrically erasable/recordable memory, for which an EEPROM or the like is used. The non-volatile memory 107 records constants, programs, and the like for the operation of the system control unit 104. The programs herein indicate those for executing flowcharts (to be described later).

The system control unit 104 includes a microcomputer, and controls the operation of each unit of the camera 100 according to a program recorded in the non-volatile memory 107, thereby implementing a reproduction control operation and recording control operation (to be described later).

Reference numeral 108 denotes a system memory, for which a RAM is used. Constants, variables, programs read out from the non-volatile memory 107, and the like for the operation of the system control unit 104 are rasterized in the system memory 108. The system control unit 104 also performs a display control operation by controlling the memory 105 and the display unit 106. The memory 105 may serve as the system memory 108.

A system timer 109 measures a time used for various control operations and the time of an internal clock.

A power switch 115, a mode switching button 110, a trigger button 111, and the touch panel 112 are operation units for inputting various operation instructions to the system control unit 104.

The power switch 115 switches ON/OFF of the power of the camera 100.

The mode switching button 110 generates a mode switching signal for switching the operation mode of the system control unit 104. According to the mode switching signal, the system control unit 104 switches the operation mode to a recording mode or reproducing mode.

The trigger button 111 generates a trigger signal for instructing the system control unit 104 to start or end a shooting operation. According to the trigger signal, the system control unit 104 starts or ends a series of processes until encoded moving image data stored in the memory 105 are written in a recording medium 114 via the image capturing unit 101, image processing unit 102, CODEC 119 and memory control unit 103.

The touch panel 112 can detect contact with the display unit 106. The touch panel 112 and display unit 106 can be integrally formed. For example, the touch panel 112 is configured so that the transmittance of light does not disturb display of the display unit 106, and is attached on the display surface of the display unit 106. Then, input coordinates on the touch panel 112 are associated with display coordinates on the display unit 106. This enables to form a GUI which looks as if the user directly operated a screen displayed on the display unit 106. The system control unit 104 can detect the following operations for the touch panel 112. That is, the system control unit 104 can detect that a finger or pen has touched the touch panel (to be referred to as a touchdown hereinafter), that a finger or pen is touching the touch panel (to be referred to as a touchon hereinafter), that a finger or pen moves while touching the touch panel (to be referred to as a move hereinafter), that a finger or pen which was touching the touch panel has left (to be referred to as a touchup hereinafter), and that nothing touches the touch panel (to be referred to as a touchoff hereinafter). The system control unit 104 is notified of these operations and position coordinates on the touch panel where a finger or pen is touching, and determines, based on the sent information, an operation performed on the touch panel. For a move, a moving direction of the finger or pen moving on the touch panel can also be determined for each vertical component/horizontal component on the touch panel based on a change in position coordinates. When a touchdown, a given move, and then a touchup are performed on the touch panel, drawing of a stroke is determined. For the touch panel, any one of various types of touch panels can be used, such as a resistance film type touch panel, a static capacitance type touch panel, a surface acoustic wave type touch panel, an infrared type touch panel, an electromagnetic induction type touch panel, an image recognition type touch panel, and an optical sensor type touch panel.

Reference numeral 118 denotes an external (I/F) interface for connecting the camera 100 with an external device, for which an I/F for USB, infrared, or wireless communication is used. By connecting a pointing device such as a mouse, pen tablet, or trackball to the external I/F 118, the pointing device can serve as an input unit instead of the touch panel 112. In this case, the system control unit 104 receives an input from the mouse connected to the external I/F 118, and displays a pointer on the display unit 106. Furthermore, in response to movement of the mouse or a click signal, the system control unit 104 performs the same control operation as that corresponding to an operation such as a touchdown, move, or touchup on the touch panel 112.

Reference numeral 116 denotes a power supply control unit, which includes a battery detection circuit, a DC/DC converter, and a switching circuit for switching blocks to be supplied with power, and detects the presence/absence of a battery, the type of battery, and the remaining battery level. The power supply control unit 116 controls the DC/DC converter based on the detection result and an instruction of the system control unit 104 to supply a required voltage to the respective units including the recording medium 114 for a required period of time.

Reference numeral 117 denotes a power supply unit, which includes a primary battery such as an alkaline battery or lithium battery, a secondary battery such as a NiCd battery, NiMH battery, or Li battery, and an AC adapter.

Reference numeral 113 denotes an interface to the recording medium 114 such as a memory card or hard disk. The recording medium 114 is a recording medium such as a memory card, which includes a semiconductor memory or magnetic disk.

The recording medium 114 records, via the I/F 113, encoded moving image data and accompanying freehand drawing input information which have been stored in the memory 105. The encoded moving image data and accompanying freehand drawing input information recorded in the recording medium 114 are read out via the I/F 113. The recording medium 114 may be a memory card, a hard disk drive, or a disk which is mounted on the camera 100, or a flash memory or hard disk drive built in the camera 100.

The embodiment will be described below with reference to FIGS. 2 to 8.

[First Embodiment]

In the first embodiment, in the camera 100 which enables the user to draw arbitrary freehand drawing input information on a screen, when a moving image is reproduced from a midpoint, the camera 100 faithfully reconstructs recorded freehand drawing input information while reproducing the moving image.

The system control unit 104 records, in a coordinate table shown in FIG. 2, in time-series, events occurring when freehand drawing input information is drawn, and refers to the coordinate table to reconstruct the freehand drawing input information in reproducing.

The system control unit 104 records this coordinate table in the recording medium 114 together with moving image data encoded when a moving image is captured. In reproducing, the coordinate table is read out from the recording medium 114 into the memory 105, and is referred to by the system control unit 104.

Each data in column t indicates the time code of a moving image in a touchon state. Since events are recorded in time-series, the time codes in column t have been sorted in the ascending order.

Each data in column x indicates an x coordinate representing a touchon position at a point of a corresponding time code in column t. Similarly, each data in column y indicates a y coordinate. A row with "-" in columns x and y indicates a point of a time code when a special event other than a touchon occurs.

Each data in column attr indicates the attribute information of an event in each row. For example, "clear" indicates that freehand drawing input information on the whole screen has been erased. Each of "pen A" and "pen B" indicates a pen point setting when a touchon is performed. The attribute information is given by operating buttons 318 and 319 (to be described later).

Like entries e2 and e3 in the coordinate table of FIG. 2, it is possible to describe a plurality of freehand drawing coordinate data with the same time code. This indicates that the freehand drawing input information was drawn before shooting of the moving image starts, or that the freehand drawing input information was drawn during the pause of moving image reproduction.

As described above, in this embodiment, the coordinate table of the freehand drawing input information is generated separately from the moving image data, and records data in association with the time code of the moving image data. Note that the coordinate table of the freehand drawing input information need only synchronize with the reproduction timing of the moving image data, and the method for this need not use the time code. For example, the coordinate table may synchronize with date/time information in recording.

Furthermore, instead of generating the coordinate table of the freehand drawing input information, the information may be embedded and recorded in a moving image data stream.

Figure 3:
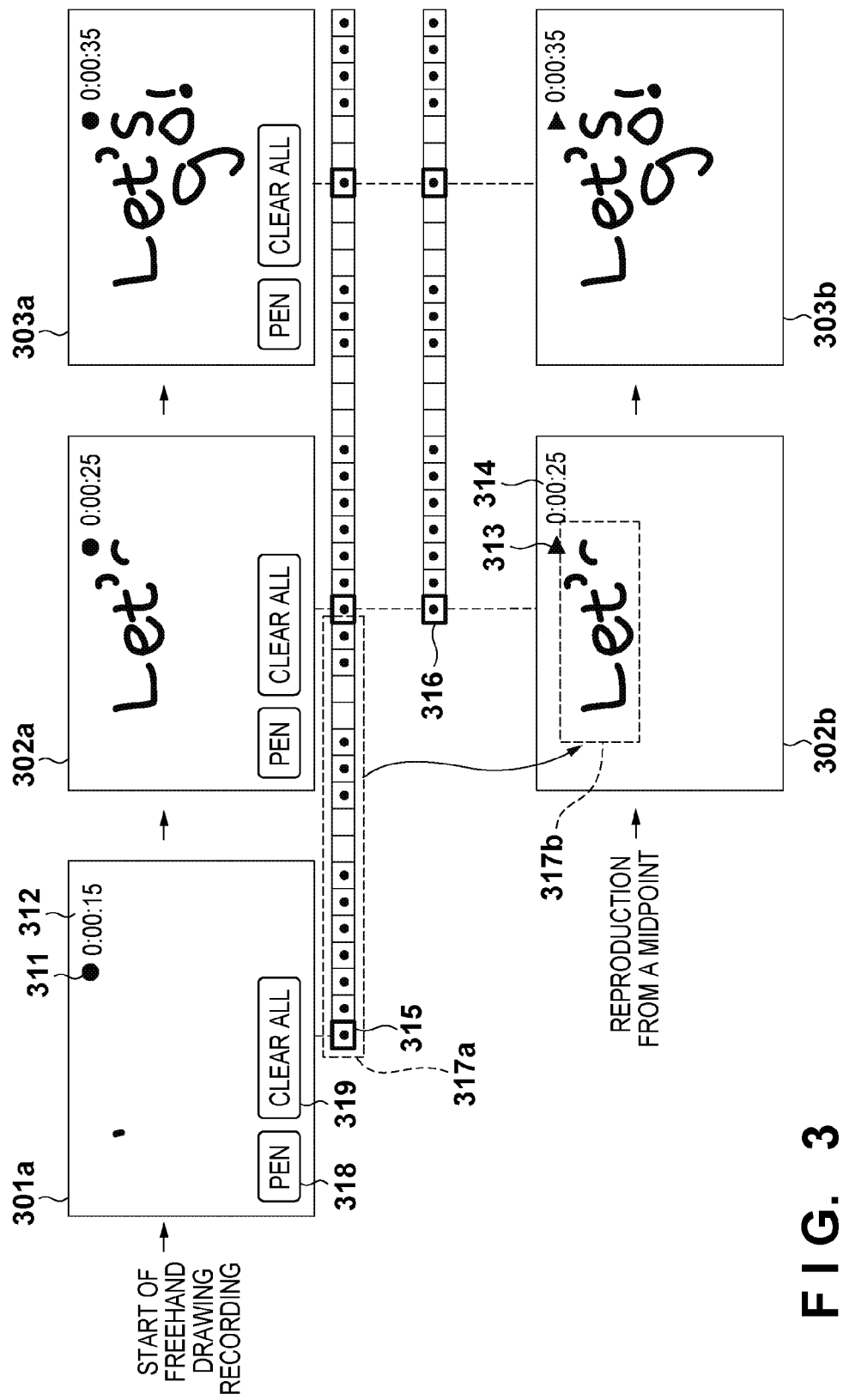
FIG. 3 is a view showing examples of a reproduction screen according to the first embodiment.

FIG. 3 exemplarily shows a screen displayed on the display unit 106 when a moving image is captured while drawing freehand drawing input information by operating the touch panel 112, and a screen displayed on the display unit 106 when the moving image is reproduced from a midpoint.

Referring to FIG. 3, reference numerals 301a to 303a denote screens each of which is displayed on the display unit 106 when a given period of time has elapsed after shooting of the moving image starts. FIG. 3 shows a process in which drawing of the freehand drawing input information starts in the screen 301a, and then ends in the screen 303a by way of the screen 302a.

Figure 9:
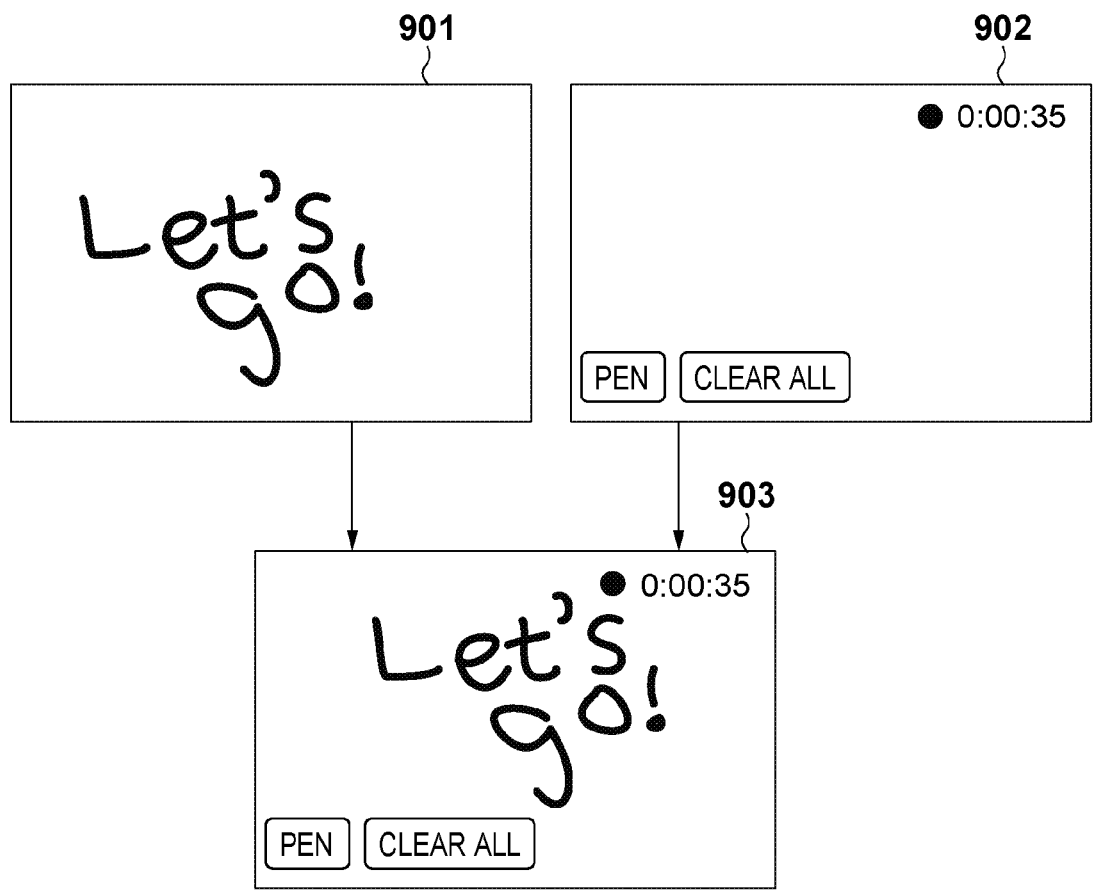
FIG. 9 is a view showing an example of the configuration of a bitmap memory.

Each of the screens 301a to 303a is formed in the bitmap memory of the memory 105. FIG. 9 shows the configuration of the bitmap memory which has an area for at least three screens.

Reference numeral 901 denotes a memory area for storing only contents of freehand drawing input information; 902, a memory area for storing OSD display elements other than the freehand drawing input information; and 903, a memory area for storing superimposition image data obtained by superimposing the freehand drawing input information in the memory area 901 on the data in the memory area 902. The system control unit 104 rasterizes data in the respective memory areas 901 to 903. The data in the memory area 903 is read out and displayed on the display unit 106 via the memory control unit 103, thereby displaying each of the screens 301a, 302a, and 303a.

Referring back to FIG. 3, reference numeral 311 denotes an icon indicating that the camera 100 is in a shooting state; and 312, a time code indicating an elapsed time after a shooting operation starts.

The button 318 is used to change a pen type for drawing freehand drawing input information. When the button is touched and selected, a screen for selecting a pen type is displayed. By selecting a pen type on this screen, it is possible to change the thickness and color of a line to be drawn freehand, or the shape of a pen point. Note that the thickness of a line to be drawn may be changed according to the size of a touched area of the touch panel instead of the pen type. The button 319 is used to erase all freehand drawing input information.

A row of rectangles starting with a rectangle 315 indicates the respective frames of the captured moving image data. A rectangle having a point within itself represents a frame for which coordinates have been input through the touch panel 112 and an entry has been added to the coordinate table of FIG. 2. An isolated rectangle having a point indicates that a point was drawn on the screen, and a sequence of rectangles each having a point indicates that a line was drawn on the screen by a move operation.

A case in which the moving image data captured and recorded as shown FIG. 3 is reproduced from the time of the screen 302a will be considered.

Reference numerals 302b and 303b denote reproduction screens which are displayed on the display unit 106 when reproduction starts from the time of the screen 302a.

Reference numeral 313 denotes an icon indicating that the camera 100 is in a reproducing state; and 314, a time code indicates a reproducing position in the whole moving image data. The freehand drawing input information, the icon 313, and the time code 314 in reproducing are data which have been rasterized in the bitmap memory by the system control unit 104.

Reference numeral 317b denotes freehand drawing input information before the reproduction start position, that is, freehand drawing input information reconstructed by reading out, from the coordinate table of FIG. 2, the freehand drawing input information within a range indicated by a rectangle 317a drawn by broken lines in FIG. 3, and rasterizing it in the bitmap memory.

A row of rectangles starting with a rectangle 316 indicates the respective frames of the moving image data to be reproduced. A rectangle having a point within itself represents a frame for which an entry exists in the coordinate table of FIG. 2. In frames after the screen 302b, freehand drawing input information is sequentially reconstructed and drawn according to the freehand drawing input information of an entry in the coordinate table, which corresponds to a time code at start of reproduction.

As described above, by tracing back before the reproduction start position to read out and draw freehand drawing input information, the same screen note as the screen 302a in a shooting operation is reconstructed on the screen 302b, and the same screen note as the screen 303a in a shooting operation is reconstructed on the screen 303b.

Note that the captured moving image data is not shown on the screens 301a to 303a for the sake of simplicity. Similarly, the moving image data read out from the recording medium 114 is not shown on the screen 302b and 303b. In fact, the icon, time code, and freehand drawing input information displayed on each screen of FIG. 3 are superimposed on the reproduced moving image, and then displayed on the display unit 106.

Although FIG. 3 assumes that a process of drawing freehand drawing input information is recorded while reproducing a moving image, freehand drawing input information may be recorded while shooting a moving image. In this case, each of the screens 301a to 303a shows a screen configuration which is displayed on the display unit 106 when a given period of time elapses after an operation of shooting the moving image starts. Furthermore, the icon 311 does not indicate that the camera 100 is in a shooting state but indicates, similarly to the icon 313, that the camera 100 is in a reproducing state.

<Reproduction Control>

A reproduction control operation for moving image data by the camera 100 of this embodiment will be described with reference to FIG. 4. Note that processing in FIG. 4 is implemented when the system control unit 104 reads out a program recorded in the non-volatile memory 107 to control each unit of the camera 100.

Figure 4:
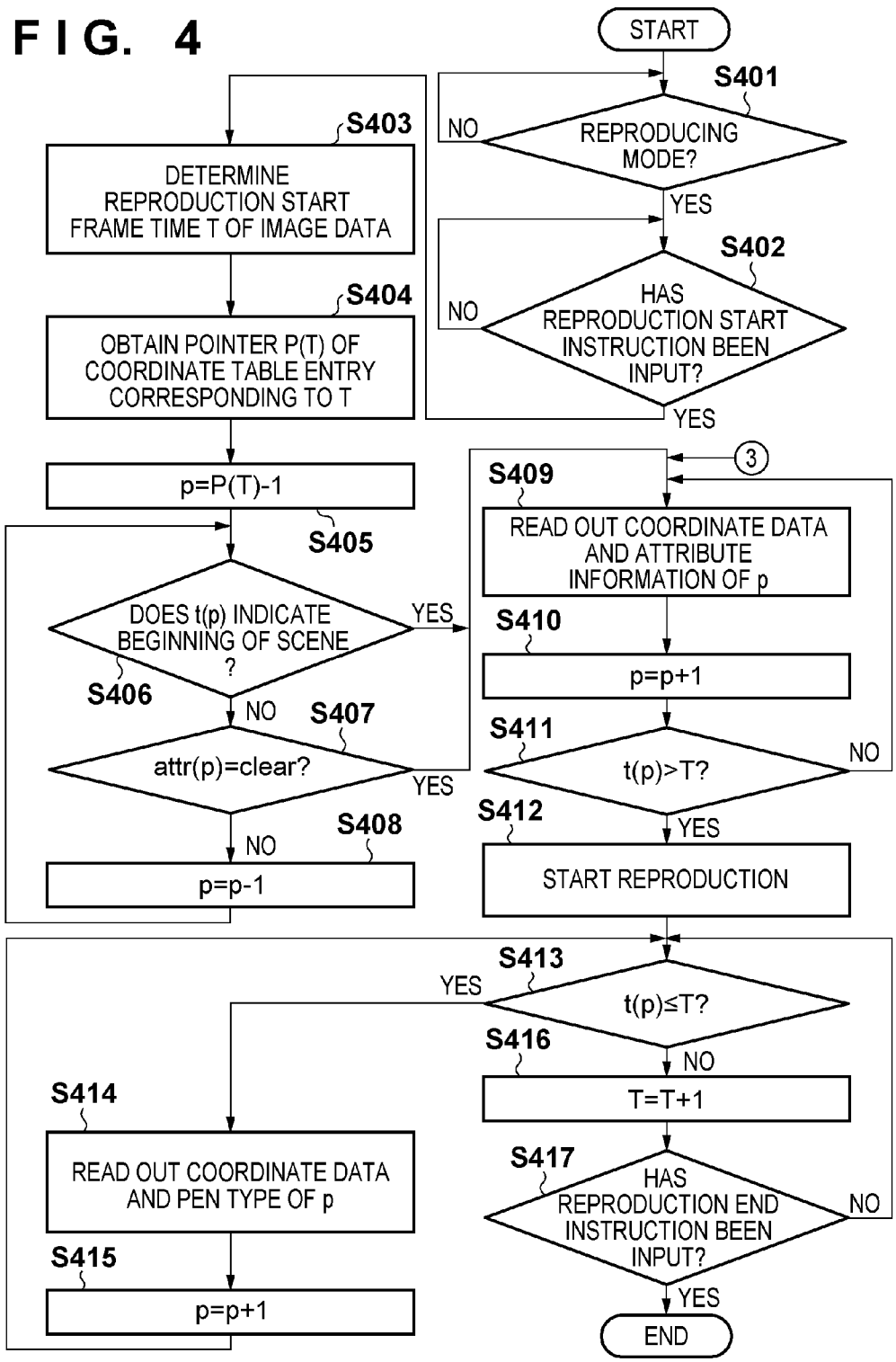
FIG. 4 is a flowchart illustrating a reproduction control operation according to the first embodiment.

Referring to FIG. 4, in step S401, the system control unit 104 determines whether the camera 100 is in a reproducing mode. If the camera 100 is not in a reproducing mode, the power switch 115 and mode switching button 110 are operated to stand by until the camera 100 enters a reproducing mode.

In step S402, the system control unit 104 determines whether a reproduction start instruction has been input by operating the touch panel 112.

In step S403, the system control unit 104 determines a reproduction start frame time (time code) T for moving image data to be reproduced. The time code T is determined based on, for example, the operation procedure of the touch panel 112 in step S402.

In step S404, the system control unit 104 obtains a pointer P(T) of an entry corresponding to the time code T in the coordinate table of FIG. 2. If no entry corresponding to the time code T exists in the coordinate table, a pointer pointing a next entry is set as the pointer P(T).

In step S405, the system control unit 104 obtains a pointer p pointing to an entry immediately before the entry pointed by the pointer P(T).

In steps S406 to S408, the system control unit 104 determines a point to which the coordinate table is traced back from the time code T. As will be described later, assume in this embodiment that the point to which the coordinate table is traced back is the beginning of a scene or a state in which all the freehand drawing input information has been erased. Furthermore, if a control operation is performed to erase contents of the freehand drawing input information when a given period of time elapses after the information is drawn, it is possible to reconstruct the freehand drawing input information at a point of the time code T by tracing back the coordinate table by the given period of time.

In step S406, the system control unit 104 determines whether a time code t(p) of the entry pointed to by the pointer p represents the beginning of a scene, that is, the time code is 0:00:00:00. If the time code represents the beginning of the scene, no coordinate data exists before it, and the process advances to step S409 to reconstruct contents of all the freehand drawing input information. Alternatively, if the time code represents a midpoint of the scene, the process advances to step S407.

In step S407, the system control unit 104 determines whether "clear" has been described in an attribute value attr(p) of the entry pointed to by the pointer p, that is, the time code t(p) indicates a state in which all the freehand drawing input information has been erased. If "clear" has been described, the process advances to step S409 to execute drawing processing from this point, thereby enabling to reconstruct contents of all the freehand drawing input information. If "clear" has not been described, the process advances to step S408.

In step S408, the system control unit 104 changes the pointer p to point to an immediately preceding entry, and the process returns to step S406.

In steps S409 to S411, the system control unit 104 reconstructs contents of the freehand drawing input information before a point of the time code T.

In step S409, the system control unit 104 reads out the coordinate data and the attribute information such as a pen type of the entry pointed by the pointer p, and rasterizes the corresponding freehand drawing input information in the bitmap memory. Although pen type data is recorded in the above description, drawing information such as the thickness and color of a drawn line, and the shape of a pen point may be recorded in addition to the pen type data.

In step S410, the system control unit 104 changes the pointer p to point to an immediately succeeding entry.

In step S411, the system control unit 104 determines whether the time code t(p) reaches the time code T. If the time code t(p) reaches the time code T, the process advances to step S412; otherwise, the process returns to step S409.

In step S412, the system control unit 104 starts to reproduce the moving image data from a point of the time code T. Reproduction of the moving image is implemented when the system control unit 104 causes, via the memory control unit 103, the CODEC 119 to decode a moving image data frame at a point of the time code T which has been read out from the recording medium 114, and displays the data frame on the display unit 106 via the image processing unit 102, the memory control unit 103, and the video memory of the memory 105. At this time, the freehand drawing input information and the OSD display elements such as an icon, which have been rasterized in the bitmap memory are also superimposed on the moving data, and then displayed on the display unit 106.

In steps S413 to S417, the system control unit 104 reconstructs contents of the freehand drawing input information according to the progress of the time code while reproducing the moving image.

In step S413, the system control unit 104 determines whether the time code T in reproducing reaches the time code t(p). If the time code T reaches the time code t(p), the process advances to step S414; otherwise, the process advances to step S416.

Similarly to step S409, in step S414, the system control unit 104 reads out the coordinate data and the attribute information such as a pen type of the entry pointed by the pointer p, and rasterizes the corresponding freehand drawing input information in the bitmap memory.

In step S415, the system control unit 104 changes the pointer p to point to an immediately succeeding entry.

In step S416, the system control unit 104 increments the time code T, and updates the moving image data frame displayed on the display unit 106.

In step S417, the system control unit 104 determines whether a reproduction end instruction has been input. The reproduction end instruction is input by operating the touch panel 112, mode switching button 110, or power switch 115. Furthermore, if the end of the moving image data being reproduced is reached, the system control unit 104 may determine the state to issue a reproduction end instruction. If the reproduction end instruction has been input, the process ends; otherwise, the process returns to step S413.

As described above, according to the embodiment, when a moving image is reproduced from a midpoint, it is possible to correctly reconstruct freehand drawing input information recorded while reproducing the moving image.

Note that although freehand drawing input information is drawn while reproducing a moving image in the embodiment, the present invention is not limited to this. That is, the present invention is effective even when only a process of drawing freehand drawing input information is reproduced. That is, it is possible to correctly reconstruct a process of drawing freehand drawing input information even when the process is reproduced from a midpoint.

[Second Embodiment]

In the second embodiment, there will be given a description of an operation of recording freehand drawing input information together with moving image data so as to correctly reconstruct the freehand drawing input information to be superimposed on the moving image data with as low capacity as possible when a moving image is reproduced from a midpoint. Note that this embodiment is implemented by a camera having the same configuration as that shown in FIG. 1.

FIG. 5 shows a table obtained by adding column bmp to the coordinate table format shown in FIG. 2. A system control unit 104 records, in the table, in time-series, events and states occurring in drawing freehand drawing input information, and refers to the table to reconstruct the freehand drawing input information in reproducing.

The system control unit 104 records this coordinate table in a recording medium 114 together with moving image data encoded when a moving image is captured. In reproducing, the coordinate table is read out from the recording medium 114 into the memory 105, and is referred to by the system control unit 104.

Columns t, x, y, and attr are the same as those in the coordinate table of FIG. 2.

Each data in column bmp indicates a file path to freehand drawing image data recording the freehand drawing input information which is displayed on a display unit 106 at a point of a corresponding time code in column t. The freehand drawing image data is generated based on data which has been rasterized in a bitmap memory by the system control unit 104, and is recorded in the recording medium 114 together with the coordinate table.

Figure 6:
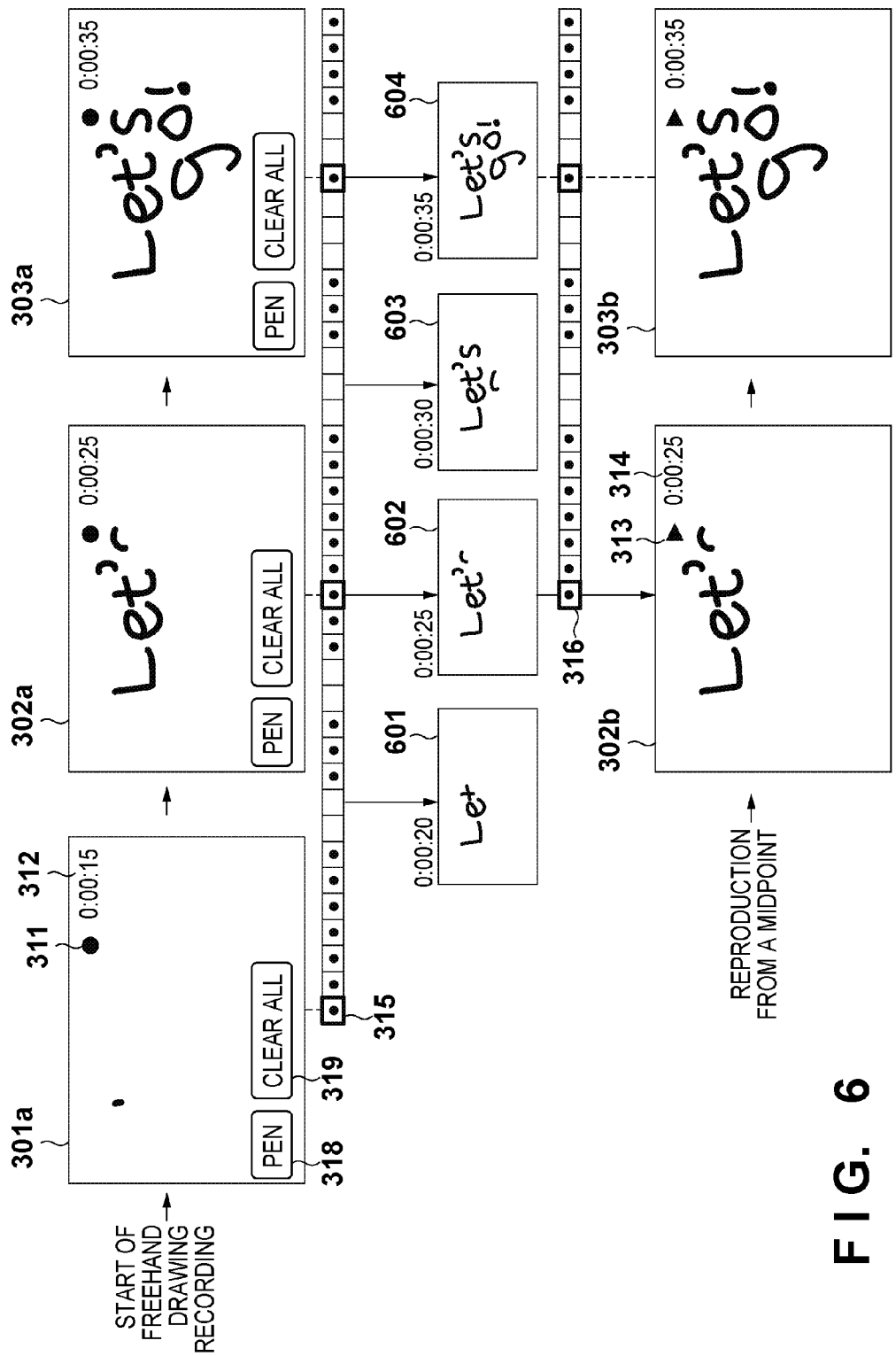
FIG. 6 is a view showing examples of a reproduction screen according to the second embodiment.

FIG. 6 exemplarily shows a screen displayed on the display unit 106 when the system control unit 104 captures a moving image while drawing freehand drawing input information by an input operation to a touch panel 112, and a screen displayed on the display unit 106 when the moving image is reproduced from a midpoint. Note that the same components as those in FIG. 3 have the same reference numerals, and a description thereof will be omitted.

Referring to FIG. 6, reference numerals 601, 602, 603, and 604 denote freehand drawing image data which have been generated by the system control unit 104, at given intervals, based on contents of freehand drawing input information stored in a memory area 901 of the bitmap memory, in shooting the moving image. The file name of the freehand drawing image data is described in the coordinate table of FIG. 5, and is recorded in the recording medium 114 in association with the time code in shooting the moving image.

A case in which the moving image data captured and recorded as shown in FIG. 6 is reproduced from the time of a screen 302a will be considered.

In this case, by tracing back to freehand drawing input information immediately before a reproduction start position, that is, tracing back from a reproduction start point to a point when freehand drawing input information is obtainable, the freehand drawing image data 602 of FIG. 6 is read out, and rasterized in the bitmap memory. Then, by executing drawing processing based on the freehand drawing input information, the freehand drawing input information at the start of reproduction is reconstructed, and a screen 302*b* is displayed on the display unit 106. After that, freehand drawing input information is sequentially reconstructed according to the coordinate data of an entry in the coordinate table, which corresponds to a time code at the start of reproduction, similarly to FIG. 3.

As described above, by reading out the freehand drawing input information immediately before the reproduction start position, and then reading out and drawing the freehand drawing input information before the reproduction start point in reverse chronological order, the same screen note as the screen 302*a* in a shooting operation is reconstructed on the screen 302*b*. Furthermore, the same screen note as a screen 303*a* in a shooting operation is reconstructed on a screen 303*b*.

Although FIG. 6 assumes that a process of drawing freehand drawing input information is recorded while shooting a moving image, freehand drawing input information may be recorded while reproducing a moving image. In this case, each of a screen 301*a* and the screens 302*a* and 303*a* shows a screen configuration which is displayed on the display unit 106 when a given period of time elapses after reproduction of the moving image starts. Furthermore, an icon 311 does not indicate that a camera 100 is in a shooting state but indicates, similarly to an icon 313, that the camera 100 is in a reproducing state.

<Recording Control>

A control operation of sequentially recording freehand drawing image data in a shooting operation by the camera 100 of the embodiment will be described with reference to FIGS. 7A and 7B. Note that processing in FIGS. 7 A and 7B are implemented when the system control unit 104 reads out a program recorded in a non-volatile memory 107 to control each unit of the camera 100.

Figure 7A:
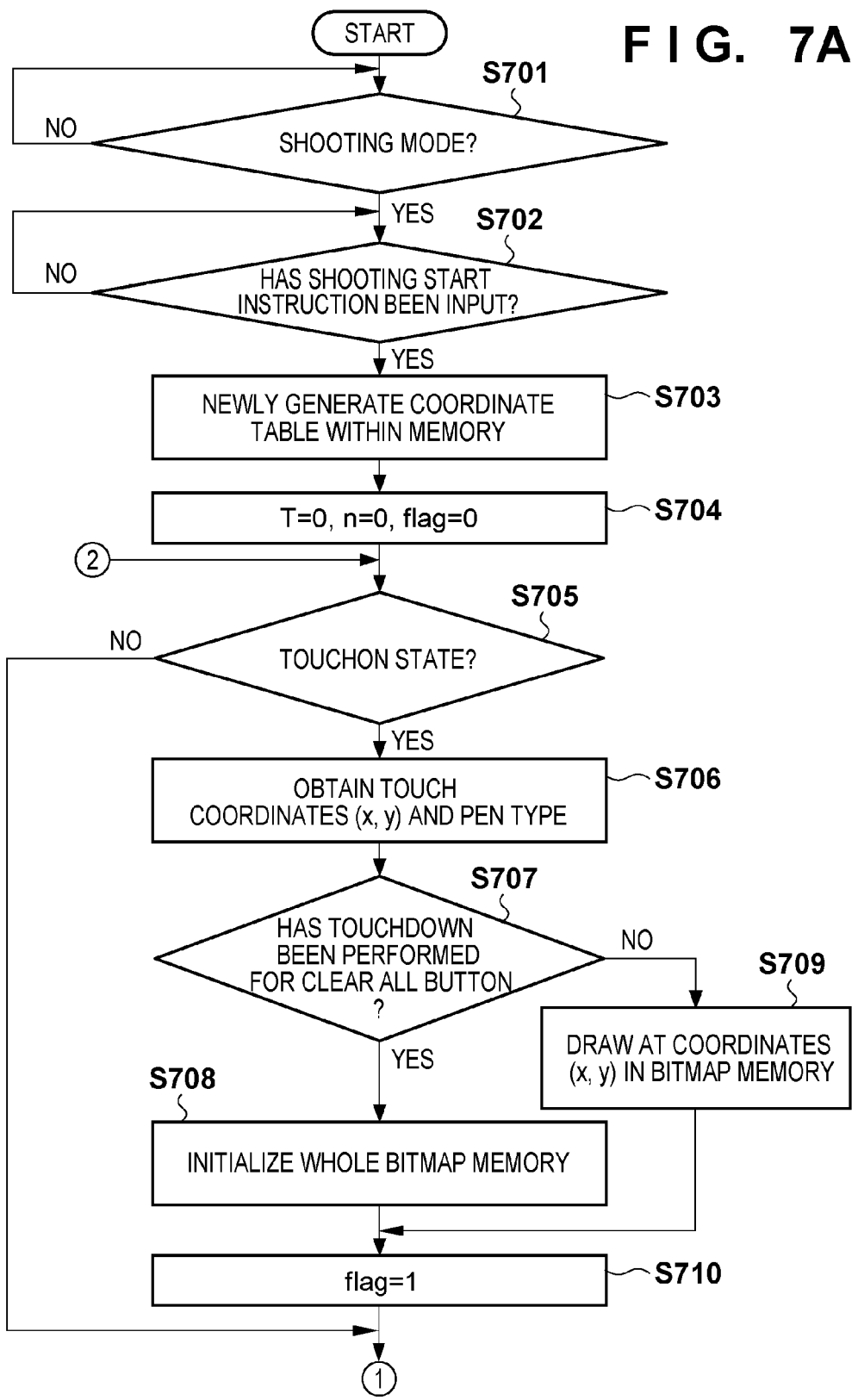
FIGS. 7A and 7B are flowcharts illustrating a recording control operation according to the second embodiment.

Referring to FIG. 7A, in step S701, the system control unit 104 determines whether the camera 100 is in a shooting mode. If the camera 100 is not in a shooting mode, a power switch 115 and a mode switching button 110 are operated to stand by until the camera 100 enters a shooting mode.

In step S702, the system control unit 104 determines whether a shooting start instruction has been input by operating a trigger button 111.

In step S703, the system control unit 104 newly generates, in the memory 105, a null coordinate table having the format shown in FIG. 5.

In step S704, the system control unit 104 generates, in the memory 105, variables including a time code T, an index n of the coordinate table, and an entry generation flag flag, and initializes the variables to 0.

In step S705, the system control unit 104 determines whether the touch panel 112 is in a touchon state. If the touch panel 112 is in a touchon state, the process advances to step S706. If the touch panel 112 is in a touchoff state, the process advances to step S709.

In step S706, the system control unit 104 obtains the coordinates (x, y) of a touchon position from the touch panel 112, and obtains a pen type from the memory 105. Although not specifically described, the pen type is determined based on a touchdown performed for a button 318, and a setting state is stored in the memory 105.

In step S707, the system control unit 104 determines whether the touchon in step S705 is a touchdown for a clear all button 319.

In step S708, the system control unit 104 initializes the whole bitmap memory, and erases all freehand drawing input information.

In step S709, the system control unit 104 draws part of freehand drawing input information in the bitmap memory according to the coordinates and pen type obtained in step S706.

In step S710, the system control unit 104 sets a flag for adding an entry to the coordinate table in step S715.

Figure 7B:
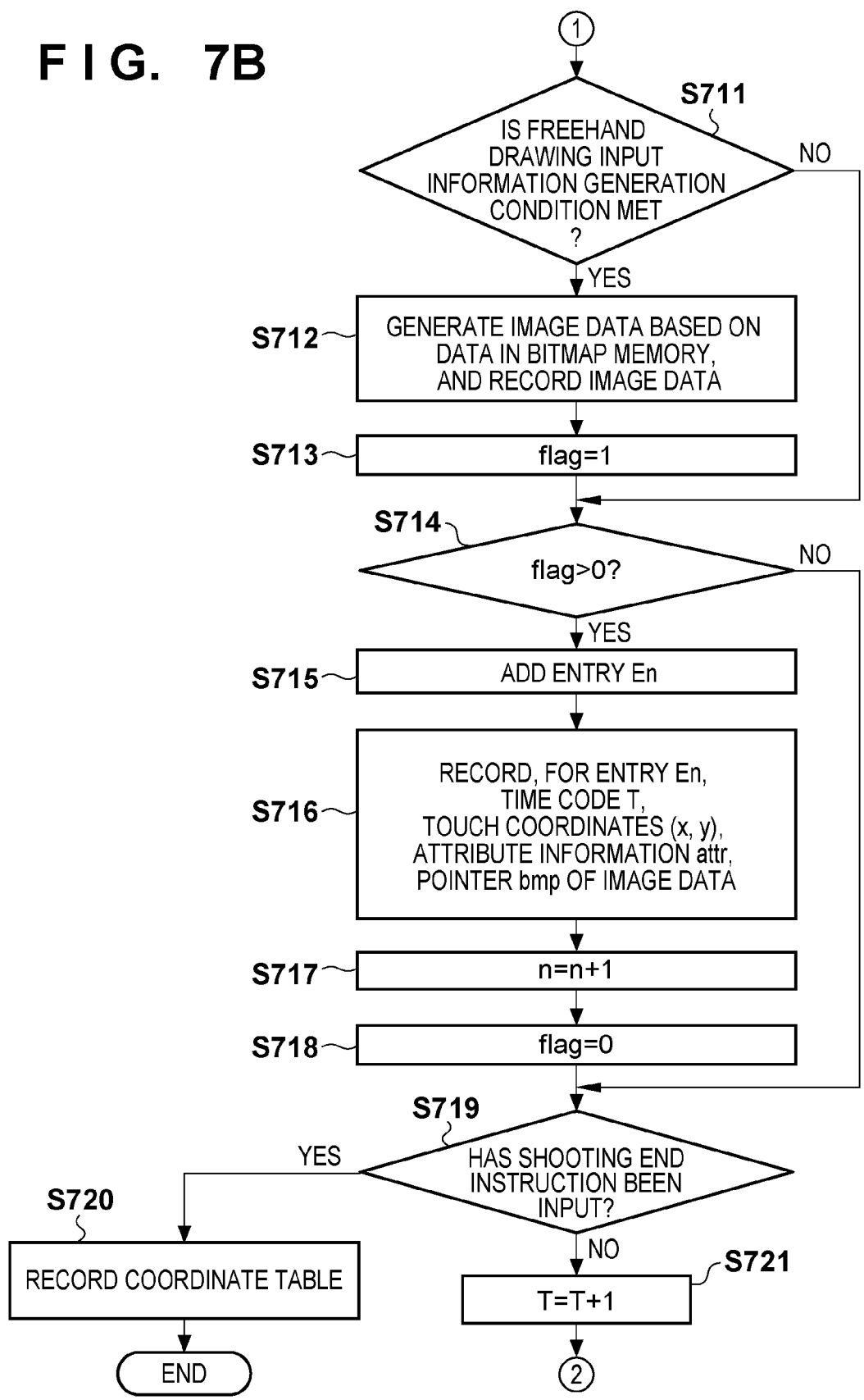

Referring to FIG. 7B, in step S711, the system control unit 104 determines whether a condition under which freehand drawing input information is generated and recorded is met. For example, a condition that the time code T reaches a given cycle may be set. In this case, since contents of the freehand drawing input information have not been changed during a touchoff state, the condition may be determined not to have been met during the touchoff state. Alternatively, a condition that a touchdown or touchup is performed a given number of times, or a condition that a given number of entries are added to the coordinate table may be set. Alternatively, when all the freehand drawing input information has been erased by the processing in step S708 or the like, the condition may be determined not to have been met.

The simultaneously recorded (reproduced) moving image is encoded (or has been encoded) by a CODEC 119 using, in many cases, an inter-frame encoding technique such as an MPEG2 or H.264 technique. The inter-frame encoding technique encodes data by a combination of an I-picture which can be decoded by itself and a P- or B-picture which can be decoded by referring to the information of preceding and succeeding pictures. In step S711, the condition may be met only at the timing of an I-picture. When the moving image data having undergone inter-frame encoding processing is reproduced from a midpoint, it is efficient to reproduce the data from an I-picture, which is often adopted. It is also efficient to store freehand drawing input information at the same timing of an I-picture.

If the condition is met in step S711, the process advances to step S712; otherwise, the process advances to step S714.

In step S712, the system control unit 104 reads out the freehand drawing input information from the memory area 901 of the bitmap memory, converts it into image data, and records it in the recording medium 114.

In step S713, the system control unit 104 sets a flag for adding an entry to the coordinate table in step S715 and subsequent steps.

In step S714, the system control unit 104 determines whether the flag for adding an entry to the coordinate table in step S715 and subsequent steps has been set. If the processing in step S710 or S713 has been executed, the determination result in step S714 is TRUE, and the process advances to step S715. If the determination result in step S714 is FALSE, the process advances to step S719.

In step S715, the system control unit 104 adds an entry En to the coordinate table.

In step S716, the system control unit 104 records members for the added entry En. The time code T, the touch coordinates x and y if the touchon state has been determined in step S705, the attribute information attr, and the file path bmp indicating the image data if it has been recorded in the recording medium 114 in step S712 are recorded. The attribute information attr indicates the pen type obtained in step S706, or the flag indicating that all data in the bitmap memory have been erased in step S708.

In step S717, the system control unit 104 increments the index n of the entry.

In step S718, the system control unit 104 initializes the flag for adding an entry to the coordinate table.

In step S719, the system control unit 104 determines whether a shooting end instruction has been input by operating the trigger button 111, mode switching button 110, or power switch 115. The shooting end instruction may be issued by the system control unit 104 by determining the state, for example, when the remaining capacity of the recording medium 114 exceeds a specific value. If the shooting end instruction has been input, the process advances to step S720; otherwise, the process advances to step S721.

In step S720, the system control unit 104 records the generated coordinate table in the recording medium 114.

In step S721, the system control unit 104 increments the time code T, and the process returns to step S705.

<Reproduction Control>

Figure 8:
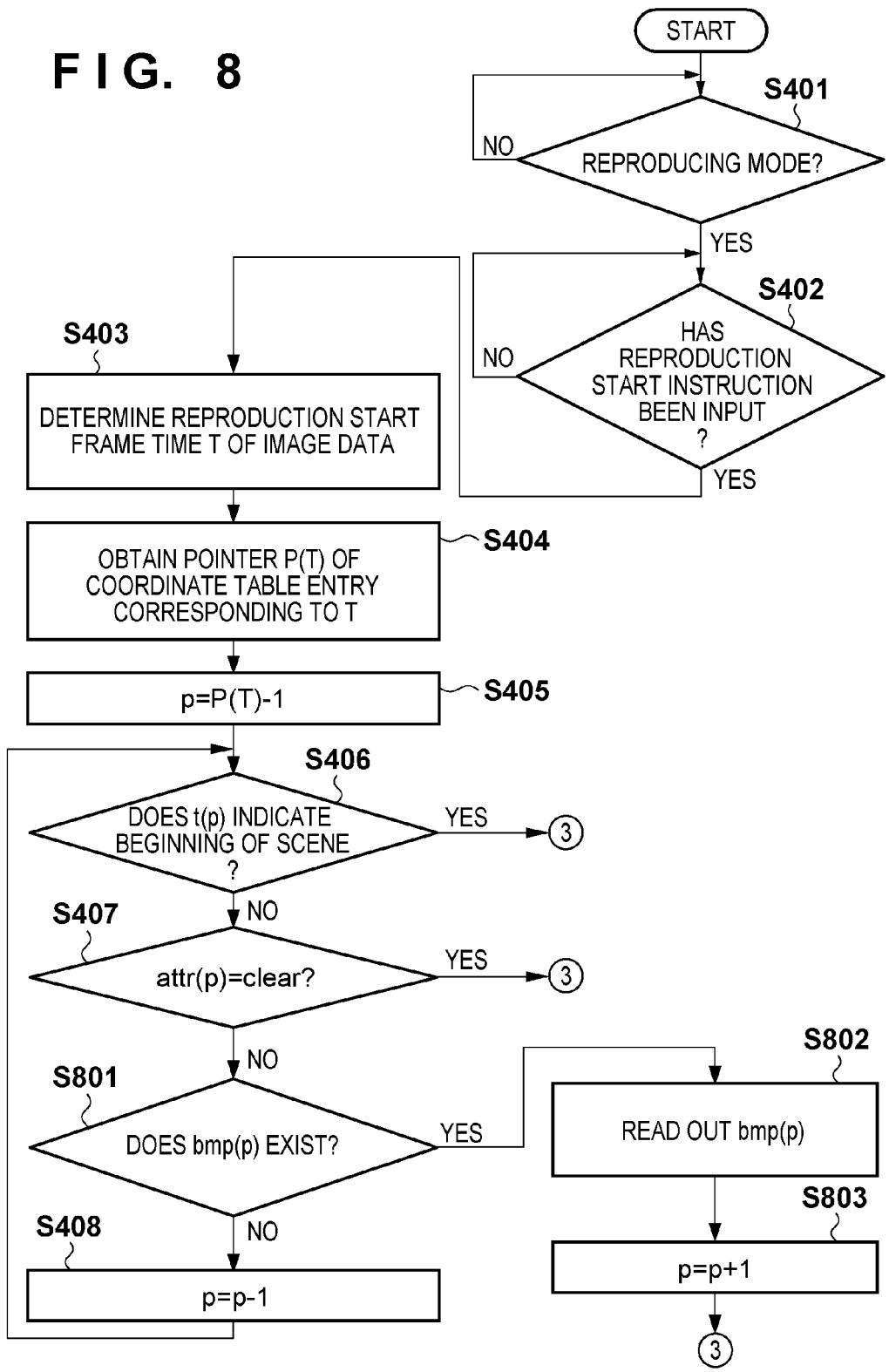
FIG. 8 is a flowchart illustrating a reproduction control operation according to the second embodiment.

A control operation performed when reproduction of a moving image starts from a midpoint as shown in FIG. 6 will be described with reference to FIG. 8. Note that processing in FIG. 8 is implemented when the system control unit 104 reads out a program recorded in the non-volatile memory 107 to control each unit of the camera 100. In FIG. 8, the same processing steps as those in FIG. 4 have the same step numbers, and a description thereof will be omitted.

Referring to FIG. 8, if it is determined in step S407 that "clear" has not been described, the process advances to step S801. In step S801, the system control unit 104 determines whether a file path bmp(p) to the image data of an entry pointed to by a pointer p exists in the coordinate table of FIG. 5. If the file path exists, the process advances to step S802; otherwise, the process advances to step S408.

In step S802, the system control unit 104 reads out the image data indicated by the file path bmp(p) from the recording medium 114, and rasterizes it in the memory area 901 of the bitmap memory. With this processing, freehand drawing input information at a point of the time code t(p) is rasterized in the bitmap memory.

In step S410, the system control unit 104 changes the pointer p to point to an immediately succeeding entry. Processing in step S409 and subsequent steps is the same as that in the flowchart of FIG. 4.

In the above-described first embodiment, to reconstruct freehand drawing input information when the user starts to reproduce a moving image from a midpoint, it is necessary to trace back to the beginning of a scene or a point when the whole freehand drawing screen has been erased. If, therefore, freehand drawing input information is continuously drawn for a long time, it is necessary to process a large amount of data to reproduce the information from a midpoint, thereby increasing the processing load.

To the contrary, in the second embodiment, since it is possible to sequentially record freehand drawing input information in shooting a moving image, it is only necessary to trace back to a point when freehand drawing input information immediately before a moving image reproduction point is recorded. As compared with the first embodiment, it is possible to reduce the data processing load when reconstructing the freehand drawing input information.

Note that in this embodiment, freehand drawing input information is recorded while shooting a moving image. The present invention, however, is not limited to this. That is, the present invention is effective even when only data necessary for reconstruction of freehand drawing input information is recorded. In this case, it is also possible to reduce the data processing load when reproducing only a process of drawing freehand drawing input information.

According to the second embodiment, it is possible to efficiently perform a fast-forward or fast-rewind reproduction operation for a process of drawing freehand drawing input information.

FIG. 10 shows the freehand drawing image data recorded by the system control unit 104 by executing the processing of FIGS. 7A and 7B, and screens displayed on the display unit 106 when the system control unit 104 performs a fast-rewind reproduction operation for the image data. Note that it is also possible to implement a fast-forward reproduction operation by performing the same control operation as that to be described below.

Referring to FIG. 10, reference numeral 1001a, 1002a, 1003a, or 1004a denotes freehand drawing input information which has been recorded by the system control unit 104 in the recording medium 114 at a given interval by executing the processing of FIGS. 7A and 7B.

Reference numeral 1001b, 1002b, 1003b, or 1004b denotes a screen displayed on the display unit 106 in fast-rewind reproduction. To fast-rewind data from a time code 0:00:35 (sec) to 0:00:20 (sec), it is possible to efficiently implement a fast-rewind reproduction operation while reducing the data processing load by sequentially reading out and displaying the freehand drawing image data from the screen 1001b to the screen 1004b as shown in FIG. 10.

Furthermore, consider a case in which when moving image data is recorded together with the freehand drawing input information, a fast-rewind reproduction operation is performed for the moving image data at intervals shorter than those shown in FIG. 10. For example, to reproduce the data from a time code 0:00:35 (sec) to 0:00:20 (sec) at intervals of one second, it is only necessary to superimpose the screen 1001b on the data from the time code 0:00:35 (sec) to 0:00:31, and to superimpose the screen 1002b on the data from the time code 0:00:30 (sec) to 0:00:26 (sec), thereby reproducing the data. Although display of the freehand drawing input information does not precisely correspond to the time code, the fast-rewind reproduction does not give an unnatural visual impression to the user. After a pause or entering a normal reproducing state, it is possible to correctly reconstruct the freehand drawing input information at that time according to the processing of FIGS. 7A and 7B, as a matter of course.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-170446, filed Aug. 3, 2011, which is hereby incorporated by reference herein in its entirety.

What is claimed is:

1. A reproduction apparatus comprising:
a reproducing unit configured to reproduce moving image data and display moving image corresponding to the reproduced moving image data on a display unit;
a drawing unit configured to enable a user to draw a freehand image on a moving image displayed on the display unit while the moving image is displayed;
a recording unit configured to record drawing process data of the freehand image corresponding to the drawn freehand image for reconstructing the freehand image drawn by said drawing unit in synchronism with a timing of reproducing the moving image data;
an instruction unit configured to cause reproduction of the moving image data to start from an arbitrary point in the middle of the moving image data; and
a control unit configured to control to display the freehand image which has been drawn up in accordance with the drawing process data of the freehand image to the point instructed by said instruction unit from the point of no freehand image drawn so as to superimpose on a moving image to be displayed at the point of start of reproduction, when said instruction unit instructs to start reproduction of the moving image data from a point in the middle of a drawing operation of the freehand image, the freehand image before the point instructed by said instruction unit, on the display unit.

2. The apparatus according to claim 1, further comprising:
a detection unit configured to detect coordinates where the drawing operation is being performed on the moving image,
wherein the drawing process data includes coordinate data detected by said detection unit, and
said recording unit records the detected coordinate data in synchronism with the timing of reproducing the moving image data.

3. The apparatus according to claim 1, wherein said recording unit records a coordinate table which includes, for each event occurring in drawing the freehand image, at least a time code of the moving image data when the drawing operation is detected, coordinates where the drawing operation is performed on the moving image at a point of the time code, and attribute information for the event, and
the attribute information includes information representing that the freehand image has been erased or information about a color or thickness of a line drawn freehand.

4. The apparatus according to claim 1, wherein said control unit controls the display unit to read out the drawing process data by tracing back to a point when the freehand image has not been drawn or has been erased, and to display the freehand image superimposed on the moving image at start of the reproduction.

5. The apparatus according to claim 1, wherein said control unit controls the display unit to read out the drawing process data by tracing back from a position where the reproduction starts by a given period of time, and to display the freehand image superimposed on the moving image at start of the reproduction.

6. The apparatus according to claim 1, wherein the display unit includes a touch panel, and the drawing process data is generated when the user operates the touch panel.

7. A control method of a reproduction apparatus having a reproducing unit configured to reproduce moving image data and display moving image corresponding to the reproduced moving image data on a display unit, a drawing unit configured to enable a user to draw a freehand image on a moving image displayed on the display unit while the moving image is displayed, and a recording unit configured to record drawing process data of the freehand image corresponding to the drawn freehand image for reconstructing the freehand image drawn by the drawing unit in synchronism with a timing of reproducing the moving image data, the method comprising:
an instruction step of causing reproduction of the moving image data to start from an arbitrary point in the middle of the moving image data; and
a control step of controlling to display the freehand image which has been drawn up in accordance with the drawing process data of the freehand image to the point instructed in the instruction step from the point of no freehand image drawn so as to superimpose on a moving image to be displayed at the point of start of reproduction, when reproduction of the moving image data is instructed to start from a point in the middle of a drawing operation of the freehand image in the instruction step, the freehand image before the point instructed in the instruction step, on the display unit.

8. A non-transitory computer-readable storage medium storing a program for causing a computer to execute the control method according to claim 7.

* * * * *